United States Patent
Sakamoto et al.

(10) Patent No.: US 7,881,311 B2
(45) Date of Patent: Feb. 1, 2011

(54) VPN COMPOSING METHOD, INTERWORK ROUTER, PACKET COMMUNICATION METHOD, DATA COMMUNICATION APPARATUS, AND PACKET RELAYING APPARATUS

(75) Inventors: Kenichi Sakamoto, Tokyo (JP); Kazuyoshi Hoshino, Fujisawa (JP); Koji Wakayama, Kokubunji (JP); Shiro Tanabe, Hidaka (JP); Noboru Endo, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/614,134

(22) Filed: Jul. 8, 2003

(65) Prior Publication Data

US 2004/0008706 A1    Jan. 15, 2004

Related U.S. Application Data

(63) Continuation of application No. 09/392,623, filed on Sep. 9, 1999, now Pat. No. 6,633,571.

(30) Foreign Application Priority Data

May 27, 1999    (JP)    ................................. 11-147663

(51) Int. Cl.
    H04L 12/46    (2006.01)
(52) U.S. Cl. ..................................... 370/401
(58) Field of Classification Search ................ 370/356, 370/395.5, 401, 351, 402; 709/249
    See application file for complete search history.

(56) References Cited

U.S. PATENT DOCUMENTS

| | | | | |
|---|---|---|---|---|
| 5,390,173 A | * | 2/1995 | Spinney et al. | 370/393 |
| 5,394,402 A | * | 2/1995 | Ross | 370/402 |
| 5,430,727 A | * | 7/1995 | Callon | 370/401 |
| 5,450,407 A | * | 9/1995 | Perlman et al. | 370/392 |
| 5,583,862 A | | 12/1996 | Callon | |
| 5,740,375 A | | 4/1998 | Dunne et al. | |
| 5,768,271 A | | 6/1998 | Seid et al. | |
| 5,884,043 A | | 3/1999 | Teplitsky | |
| 5,892,912 A | | 4/1999 | Suzuki et al. | |
| 5,920,566 A | | 7/1999 | Hendel et al. | |
| 6,035,105 A | * | 3/2000 | McCloghrie et al. | 709/236 |
| 6,081,524 A | * | 6/2000 | Chase et al. | 370/389 |

(Continued)

FOREIGN PATENT DOCUMENTS

EP    0923268 B1    7/2007

(Continued)

OTHER PUBLICATIONS

Kent, Security Architecture for the Internet Protocol, RFC 2401, Nov. 1998, pp. 1-65.*

*Primary Examiner*—Dmitry H Levitan
(74) *Attorney, Agent, or Firm*—Mattingly & Malur, P.C.

(57) ABSTRACT

A method serves to compose a VPN (Virtual Private Network) over a plurality of networks, each of which is managed by a different Internet Service Provider (ISP). When a packet with a first capsule header used for composing a VPN in a first ISP network is transmitted to a second ISP network, a route for outputting the packet to the second ISP network is determined based on the information both in the capsule header and in the IP header. In addition, a second capsule header used for composing a VPN in the second ISP network is determined based on the above information.

21 Claims, 23 Drawing Sheets

PROCESSING FLOW IN INTERWORK ROUTER

U.S. PATENT DOCUMENTS

| | | | |
|---|---|---|---|
| 6,219,699 B1 * | 4/2001 | McCloghrie et al. | 709/221 |
| 6,304,901 B1 * | 10/2001 | McCloghrie et al. | 709/221 |
| 6,392,997 B1 * | 5/2002 | Chen | 370/252 |
| 6,614,791 B1 * | 9/2003 | Luciani et al. | 370/395.53 |
| 2003/0118034 A1 | 6/2003 | Furukawa et al. | |

FOREIGN PATENT DOCUMENTS

| | | |
|---|---|---|
| JP | 09205461 | 8/1997 |
| JP | 11041280 | 2/1999 |
| WO | 9900945 | 1/1999 |
| WO | 9918751 | 4/1999 |

* cited by examiner

PROCESSING FLOW IN ROUTER

PROCESSING FLOW
IN INTERWORK ROUTER

PROCESSING FLOW
IN INTERWORK ROUTER

*FIG.13*

| ATM HEADER IN INPUT SIDE 300 | | VPN NUMBER IN INPUT SIDE 303 | |
|---|---|---|---|
| VPI/VCI 301 | CLP 302 | INTERNAL VPN NUMBER 304 | QoS 305 |
| a | 0 | 0 | 0 |
| b | 1 | 12 | 7 |
| ⋮ | | ⋮ | |
| m | 0 | 20 | 0 |
| n | 0 | 22 | 0 |

⟵ INPUT KEY ⟶ ⟵ OUTPUT KEY ⟶

FIG.15

| CAPSULE HEADER IN INPUT SIDE 310 | | VPN NUMBER IN INPUT SIDE 303 | |
|---|---|---|---|
| CAPSULE HEADER ( SA ) 311 | TOS 312 | INTERNAL VPN NUMBER 304 | QoS 305 |
| a | 0 | 0 | 0 |
| b | 1 | 12 | 7 |
| ⋮ | | ⋮ | |
| m | 0 | 20 | 0 |
| n | 0 | 22 | 0 |

←———— INPUT KEY ————→←———— OUTPUT KEY ————→

FIG.17

| VPN NUMBER IN INPUT SIDE 320 | | IP HEADER 323 | OUTPUT ROUTE NUMBER 325 | CAPSULE NUMBER IN OUTPUT SIDE 326 | |
|---|---|---|---|---|---|
| INTERNAL VPN NUMBER 321 | QoS | DESTINATION ADDRESS | | CAPSULE NUMBER | QoS |
| 1 | 0 | A.a.a.a | 15 | 5 | 0 |
| 1 | 0 | b.a.a.a | 10 | 7 | 0 |
| ............ | | | ............ | ............ | |
| n | 0 | b.a.a.a | 8 | 13 | 0 |
| n | 0 | c.a.a.a | 2 | 11 | 0 |

322 — 324 — 327 — 328

← INPUT KEY →    ← OUTPUT KEY →

*FIG.18*

| CAPSULE NUMBER IN OUTPUT SIDE 330 | | ATM HEADER IN OUTPUT SIDE 333 | |
|---|---|---|---|
| LOWER LAYER NUMBER | QoS | VPI/VCI | CLP |
| 5 | 0 | a | 0 |
| 7 | 0 | b | 1 |
| ⋮ | | ⋮ | |
| 13 | 0 | m | 0 |
| 11 | 0 | n | 0 |

⟵ INPUT KEY ⟶ ⟵ OUTPUT KEY ⟶

VPN COMPOSING METHOD, INTERWORK ROUTER, PACKET COMMUNICATION METHOD, DATA COMMUNICATION APPARATUS, AND PACKET RELAYING APPARATUS

The present application is a continuation of application Ser. No. 09/392,623, filed Sep. 9, 1999 now U.S. Pat. No. 6,633,571, the contents of which are incorporated herein by reference.

BACKGROUND OF THE INVENTION

The present invention relates to a method of composing a VPN (Virtual Private Network) on the Internet and an interwork router used to connect Internet service providers to each other.

Various applications such as E-mail and WWW (World Wide Web) programs can be used on any Internet Protocol (IP) networks. In addition, such IP networks can be composed at lower costs than the conventional switching networks that use are associated with telephones. This is why the Internet has rapidly come into wide use in recent years. Under such circumstances, intracompany networks (intranets) composed on the IP level are now indispensable for facilitating the activities of those companies.

Companies are often distributed unevenly in local areas. In such a situation, therefore, there will appear a demand that the intranets in those local areas should be connected into one network as a logical consequence. In such a case, there are the following two methods possible for connecting those intranets to each other in local areas.

Firstly, private lines are used for connecting those intranets in local areas. In this case, each of those intranets can be isolated from external networks for ensuring security.

Secondly, the IPsec (IP security protocol) technique is used to provide each terminal with a function for identifying packets of its own company's network, so that those packets are transferred on the Internet as IP packets using global addresses. This identifying function, when combined with an encoding technique, can make up a Virtual Private Network (VPN) so as to be protected from the attacks of malicious users.

If such private lines are used; however, some problems arise; for example, the network cost is increased, and furthermore, the VPN realized by the IPsec method cannot be protected from the attacks and invasions of malicious users who can crack the codes. In addition, the encoding processing becomes a bottleneck of increasing the speeds for fast networks and terminal costs are increased.

Along with the rapid spread of the Internet, as well as the cost reduction of using the Internet, there have appeared strong demands for forming virtual private networks on the Internet using the functions of lower layers than the IP layer provided by networks, while suppressing the cost and isolating each of those virtual private networks from external networks so as to assure the security and quality thereof.

In order to meet such demands, the following VPN is proposed. A packet is encapsulated at the inlet of the object network of an Internet Service Provider (ISP) that provides the VPN. On the ISP network, each packet is transferred according to the capsule header, then the capsule header is removed at the outlet of the network. According to this VPN composing method, since a packet is encapsulated peculiarly to the VPN, the VPN is isolated from external networks, thereby assuring the security of the VPN. More concretely, for such an encapsulation protocol various methods are available, such as IP encapsulation, MPOA (Multi Protocol over ATM), MPLS (Multi Protocol Layer Switching), etc. Since February of 1999, those methods have been under examination in such standardization groups as ITU-T SG13 (International Telecommunications Union-Telecommunications Standardization Section, Study Group 13), IETF (Internet Engineering Task Force), etc. In addition, ITU-T SG13 is also examining the Core Protocol of the Global Multi-media Network Connection Less (GMN-CL) for transferring packets encapsulated according to E.164 addresses in the object network.

"Access Network Systems and Edge Nodes Systems for the Next-Generation Computer Network", pp. 425-434, NTT R&D vol. 47 No. 4, 1998 (issued on Apr. 10, 1998) has also proposed a method for composing an edge node in an accessing system used to interwork between each of a plurality of user networks and the core network in the GMN-CL.

SUMMARY OF THE INVENTION

In recent years, the areas of activities in companies have expanded more and more widely. For example, many Japanese companies have offices at overseas, including the United States of America and European countries. Under such circumstances, it would be natural for those companies to consider it important to connect the intranets composed in their offices to each other via a VPN.

On the other hand, since each ISP generally provides the services only in a specific area, the VPN must be composed over a plurality of ISPs in order to connect the networks (intranets) in those areas through the VPN.

And, if a plurality of ISPs are connected to each other in such a way, an interwork gateway (interwork router) needs to be formed for such connection. In this interwork router, the interwork is realized so as to transfer each of the packets from one of the ISP networks to the other according to the IP header. In addition, a system referred to as an IX (Internet Exchange) is used for connecting both networks to each other so as to realize the interwork among a plurality of networks as described in "Commercial IX", pp. 146-155, Nikkei Communications 1997.12.15. And, this IX may also be used to transfer IP packets among those networks. Such an IX includes some methods that use a "layer 3 forwarding" function for identifying and transferring each of the IP packets, as well as a "layer 2 forwarding" function for transferring each of the IP packets by identifying the header in the lower layer in the ATM (Asynchronous Transfer Mode) communication system, etc.

The present inventors have examined the problems which arise when a VPN is composed over a plurality of ISP networks. At first, packets are encapsulated in order to compose a VPN for the network of each Internet Service Provider. Generally, the encapsulation protocol of each network differs from other networks. In this case, the IP header information of each IP packet is retrieved by the interwork router, thereby determining the route to the destination. In this case, the retrieving must also include a check to determine whether or not the packet is to be transferred to another network. The IP header information is common for both of the networks.

However, the interwork router terminates the protocol of each layer lower than the IP layer at the interface. Therefore, the capsule header given in the previous network so as to compose the VPN is removed in the process of retrieving the IP address, so that information as to the next leg of the route can be determined. After that, a new capsule header must be generated and added to the packet so as to compose the VPN in the next network. Consequently, packets in the VPN are mixed with packets in other networks in the interwork router.

And, this might cause a problem that malicious users are able to change the headers to those packets and invade the VPN through the interwork router.

Some companies do not use global addresses, but use private addresses for composing their VPNs. In such a case, once the interwork router removes the capsule header of a packet, the receiving ISP cannot distinguish the packet from others if the packet has the same address as those of other packets. This is because each of a plurality of VPNs use internal addresses uniquely. Consequently, the receiving ISP receiving cannot determine the destination of the packet. If a VPN is composed over a plurality of ISPs on the Internet, therefore, the problem as described above be solved by all means.

In addition, the types of services are not the same among ISPs. As for the communication quality, for example, assume that one ISP uses an ATM VC (Virtual Channel) for forming a communication path, thereby assuring the quality of each VPN and the other ISP uses Diffserv (Differentiated Services) to assure the quality of the communication. If the VPNs composed for both networks are to be connected to each other in such a case, it will be difficult to provide the communication quality on an end-to-end level.

As described above, it is difficult to compose a VPN over a plurality of ISPs on the Internet for practical use.

Under such circumstances, therefore, it is an object of the present invention to solve the above problems and provide a method of composing a VPN over a plurality of ISPs and provide an interwork router for connecting those ISPs to each other in such a VPN.

In order to solve the above problems, the interwork router of the present invention is provided with functions for determining the route to output packets and for generating a capsule header for each of those packets to be used in the next ISP network (in output side) from the information set both in the capsule header, which is a VPN identifier, and in the IP header of the packet. Hereunder, a more detailed description will be made of an example of how to connect a plurality of ISPs to each other. Each of those ISPs is used to operate an MPLS network that uses an ATM as a lower layer. More concretely, header information is added to each packet to be transferred to the next network. Such header information is generated when header information such as VPI, VCI, etc. (capsule headers) of the ATM are used to identify the VPS, as well as to determine the next route and identify the VPN in the next network, which header information is generated with necessary data retrieved according to an IP address as a key. And, the header information is generated and transferred together with the packet to the next network.

A VPN interwork can thus be realized, thereby enabling the VPN to be composed on the Internet in areas covering a plurality of ISPs.

The value of the field that indicates the QoS in the capsule header on the input side is mapped on the value of the field that indicates the QoS in the capsule header for the output side. Consequently, quality information of both networks composing a VPN can be transferred as is.

BRIEF DESCRIPTION OF THE DRAWINGS

FIG. 13 is a diagram of a VPN number table for receiving, provided in the lower layer processing unit of the present invention.

FIG. 15 is a diagram of a VPN number table for receiving, provided in the lower layer processing unit of the present invention.

FIG. 17 is a diagram of a route retrieval table/VPN table provided in the packet layer processing unit of the present invention.

FIG. 18 is a diagram of a header generating table provided in the lower layer processing unit of the present invention.

DESCRIPTION OF THE PREFERRED EMBODIMENTS

Hereunder, various embodiments of the present invention will be described with reference to the accompanying drawings.

Figure 1:
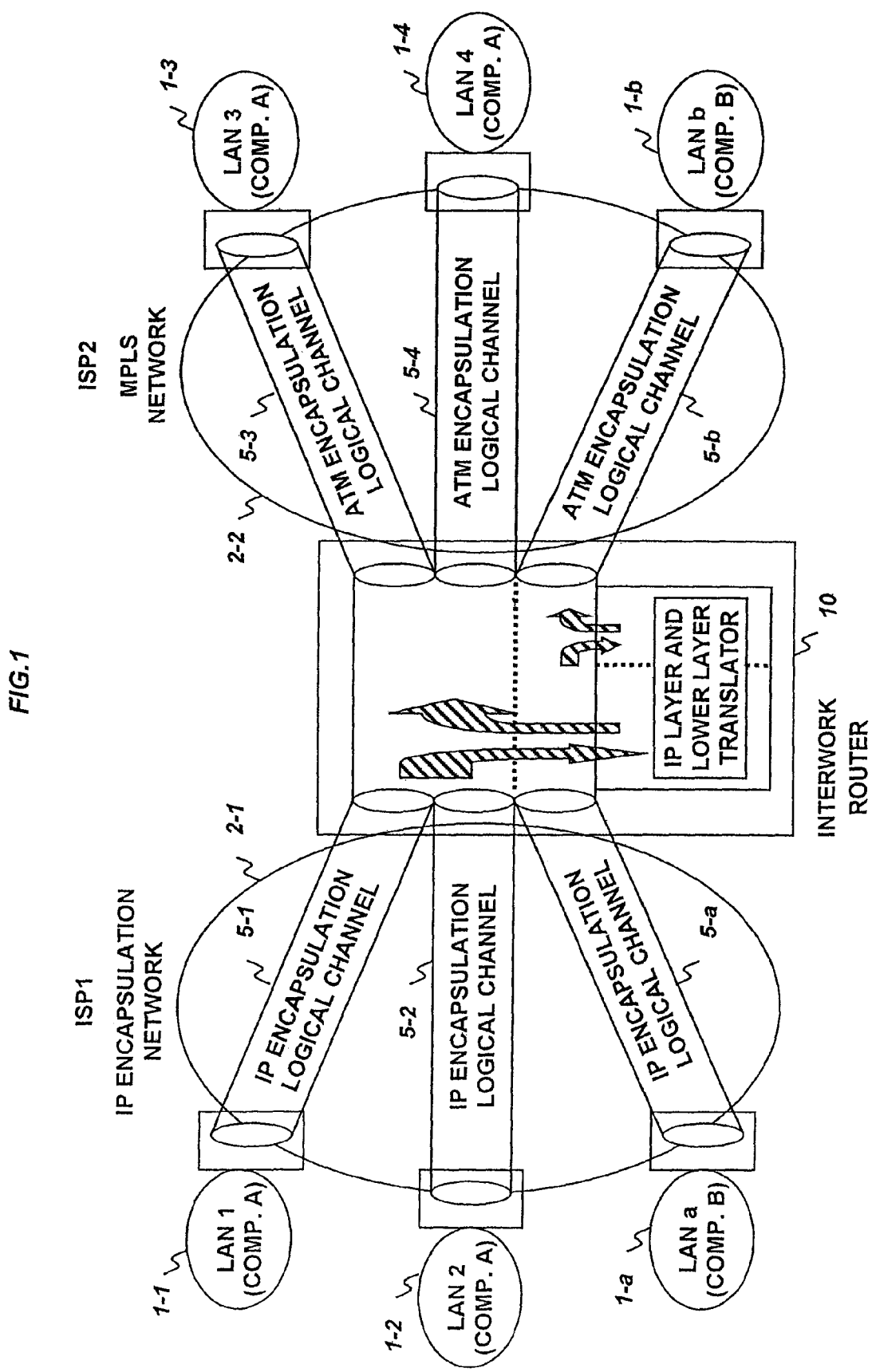
FIG. 1 is a schematic diagram showing an example of the operation of an interwork router according to the present invention.
Figure 2:
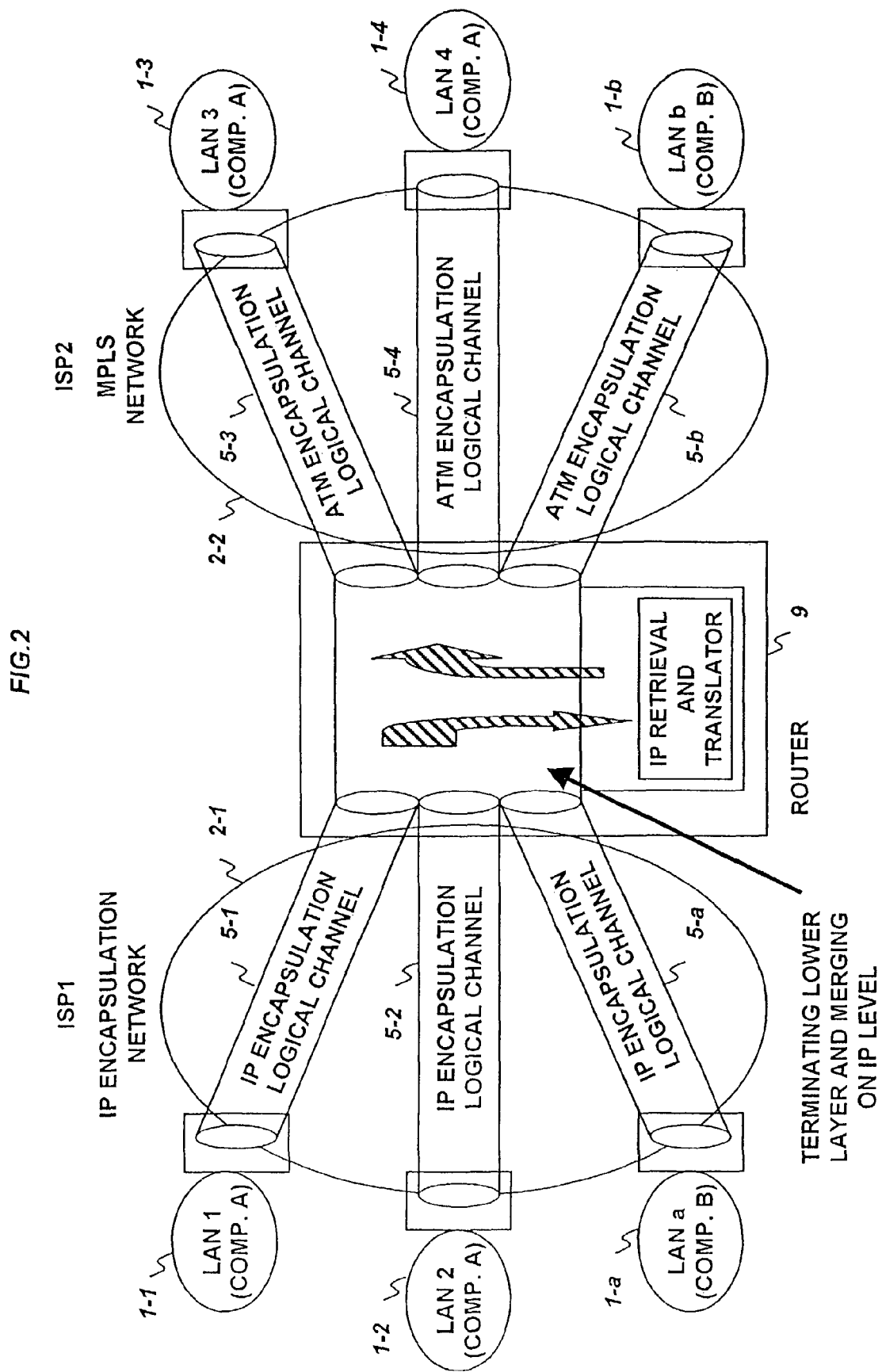
FIG. 2 is a schematic diagram illustrating an example of problems solved by the present invention.

At first, a description will be made for how to compose a VPN over a plurality of ISPs, which are separated by a lower layer, respectively, according to the present invention, as well as the role of the interwork router of the present invention, with reference to FIGS. 1 and 2. A lower layer as mentioned here is a protocol for encapsulating the header of each IP packet. This capsule header will also be described as a header of the lower layer even when each IP packet is encapsulated according to the IP header.

Hereunder, a description will be made of problems that will arise when a VPN is composed over a plurality of ISPs using a conventional router, with reference to FIG. 2. In FIG. 2, both ISP1 (2-1) and ISP2 (2-2) are interworking using a conventional router (9). The ISP1 and ISP2 are used to compose a VPN by encapsulating packets in a layer lower than the IP layer. The ISP1 provides services in the area A and includes LAN (Local Area Network) 1 (1-1), LAN2 (1-2), and LANa (1-a). The ISP2 provides services in the area B and includes LAN3 (1-3), LAN4 (1-4), and LANb (1-b). LAN1 to LAN4 belong to company A, which is planning to compose a VPN over those LANs. Both LANa and LANb belong to company B, which is different from company A and which is also planning to compose a VPN over those LANs. In such a case, if an encapsulation channel is provided between an inlet and an outlet of a network in the same ISP, packets of a specific user can be separated from packets of other users. A higher security network can thus be composed. However, if a VPN is to be composed over both ISP1 and ISP2, the conventional router terminates the lower layer at the interface on the input side and merges packets on the IP level, then executes the packet forwarding. And, this causes a problem in that packets from a plurality of users are mixed on the IP level. In other words, packets in a VPN are mixed with packets of other networks. Consequently, this makes it possible for malicious users to enter the network using false IP addresses. In addition, if two companies compose a LAN respectively using private addresses, each of those companies assigns its addresses independently. Thus, both of the companies might assign the same IP addresses. In such a case, the conventional router cannot transfer packets correctly due to conflict created by those addresses.

Next, how the present invention will solve the above problems will be described with reference to FIG. 1. For example, assume now that the company A sends data from LAN1 to LAN3 of the same company A. In this embodiment, the ISP1 composes a VPN by encapsulating IP packets and the ISP2 composes a VPN by encapsulating packets in a MPLS network, which uses the ATM. Packets received by the ISP1 (2-1) from LAN1 are encapsulated as IP packets by the ISP1, and then they are received by the interwork router through the IP encapsulation logical channel (5-1). The interwork router (10) retrieves the output route from both of the IP-capsule header, indicating the IP encapsulation logical channel through which the object packet is received, and the header of the original packet, and then creates a new capsule header for the packet, which is to be used in the ISP2. In this embodiment, since the ISP2 provides services using MPLS, the interwork router creates an ATM header for the packet. Packets encapsulated by ATM are then transferred to LAN3 through the ATM logical channel (5-3). Since the interwork router retrieves the output route from both capsule header and IP header, it can transfer packets to the correct addresses even when both companies A and B use private addresses and a conflict occurs between IP addresses.

Although a description has been made of two encapsulating methods as encapsulating protocols in this embodiment, that is, IP encapsulation, which is an encapsulation method for the IP layer and ATM encapsulation, frame relay and HDLC protocols may also be used for such encapsulation.

Figure 3:
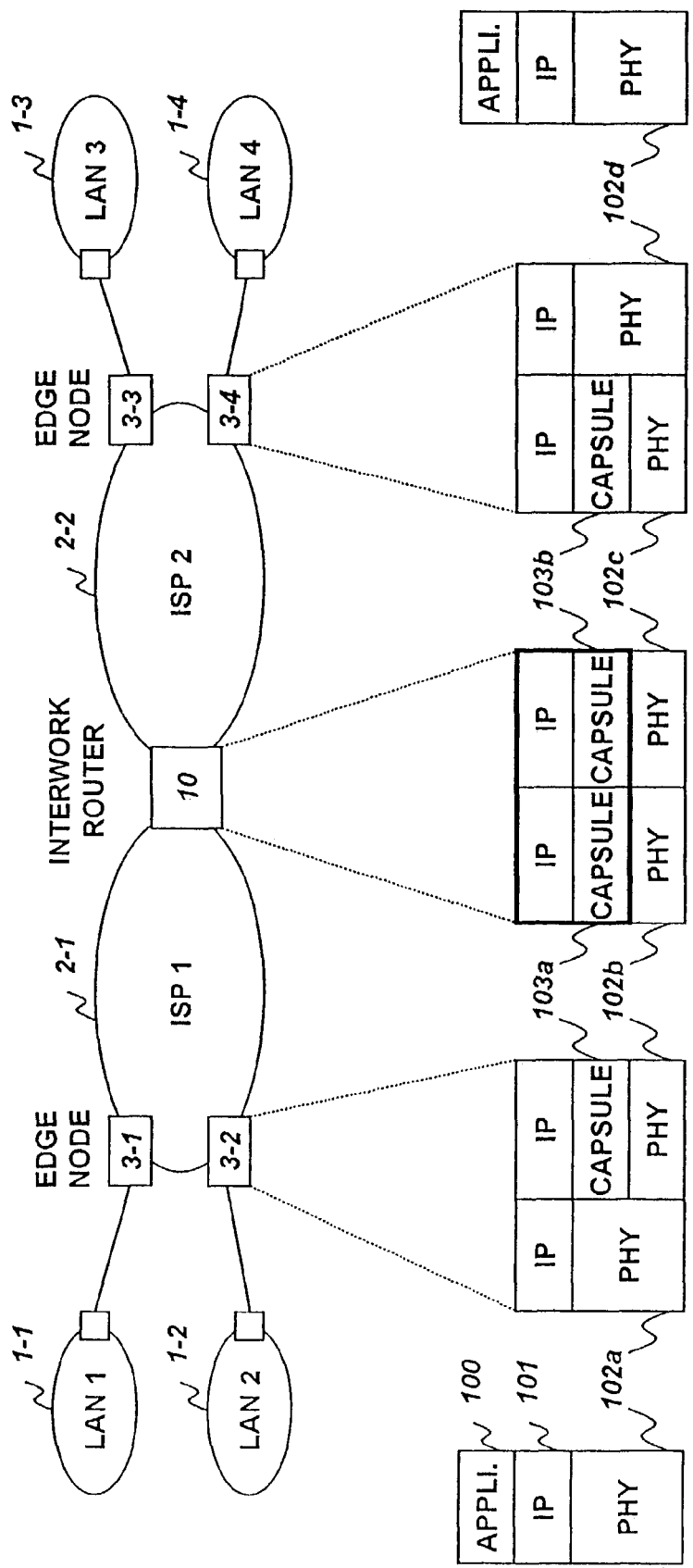
FIG. 3 is a diagram which shows the operation of the interwork router of the present invention using a protocol stack.

Next, a description will be made of an embodiment of the present invention for a method of composing a VPN over a plurality of ISPs using a network configuration and a protocol stack, with reference to FIG. 3. Any encapsulation protocol may be used in this embodiment. The ISP1 (2-1) is connected to LAN1 (1-1) and LAN2 (1-2) via edge nodes (3-1 and 3-2) respectively. In the same way, the ISP2 (2-2) is connected to a plurality of networks including LAN3 (1-3) and LAN4 (1-4) via edge nodes (3-3 and 3-4), respectively. Each of those ISPs encapsulates each of the IP packets using the header used inside the network between the inlet and the outlet of the network. Since the ISP assigns a capsule header to each of those IP packets uniquely to the subject VPN, the VPN traffic is identified among other traffic on the network, thereby enabling the VPN network to be a closed network. Both ISP1 (2-1) and ISP2 (2-2) interwork using the interwork router (10), thus the packets to the destination network are transferred via the interwork router (10).

For example, if a VPN (VPN1 in this case) connects both LAN1 and LAN2, each of the IP packets sent from LAN1 to LAN3 is retrieved according to the IP address at the edge node (3-1). At first, the packet is recognized to be addressed to the interwork router belonging to the VPN1, then a capsule header (103a) is added so that the packet is addressed to the interwork router belonging to the VPN1. The packet can thus be received correctly by the interwork router (10). The interwork router (10) retrieves the packet according to the capsule header (103a) and the IP address of each packet so as to be recognized as a packet addressed to the edge node (3-3) of the VPN1. Then, a capsule header (103b) is added to the packet so that it is addressed to the edge node (3-3) in the ISP2. The packet is thus transferred to the edge node (3-3) in the ISP2 according to the capsule header information. At the edge node (3-3), the capsule header is removed from the packet. The packet is then transferred to LAN3. Consequently, IP packets can be transferred in the VPN composed over the two networks so as to be prevented from mixing with packets belonging to other traffic.

IP packets, when they use global addresses, can be transferred just like they are transferred in the conventional networks, if both the destination (when capsule headers are used) and the capsule header of each packet are considered together without depending on the lower layer information.

Figure 4:
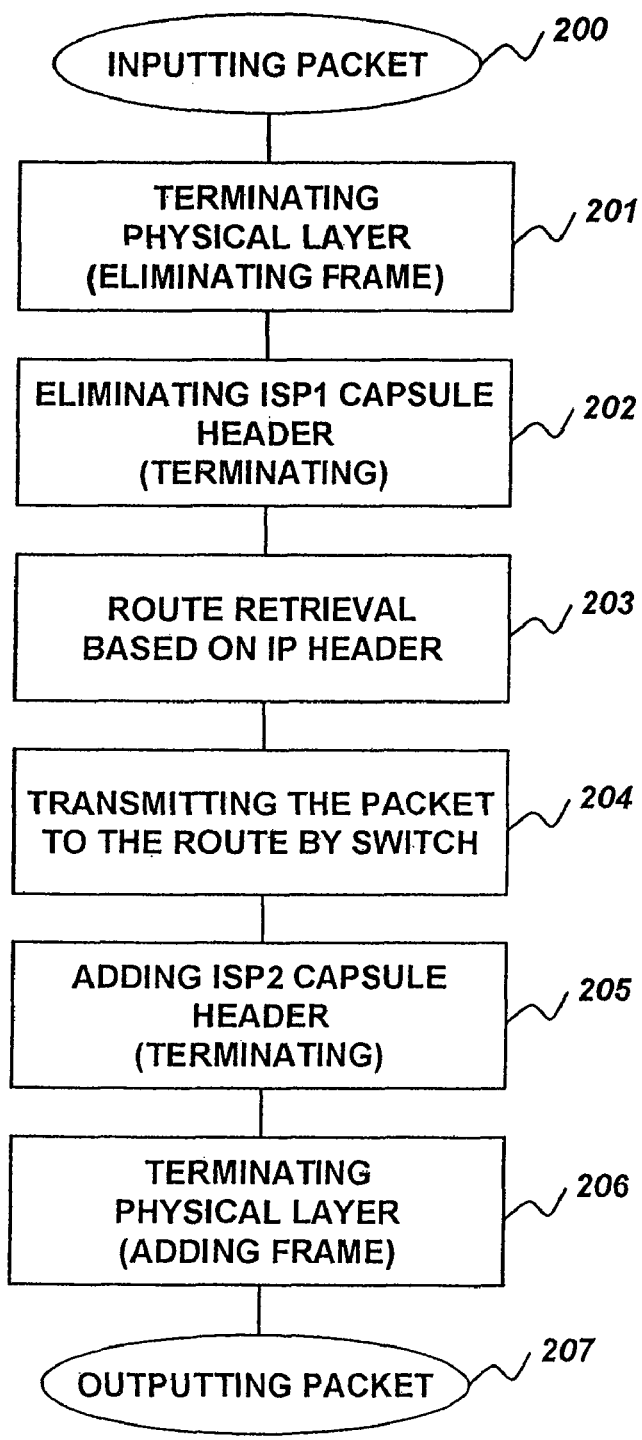
FIG. 4 is a flow chart indicating an ISP interworking method that uses a conventional router.
Figure 5:
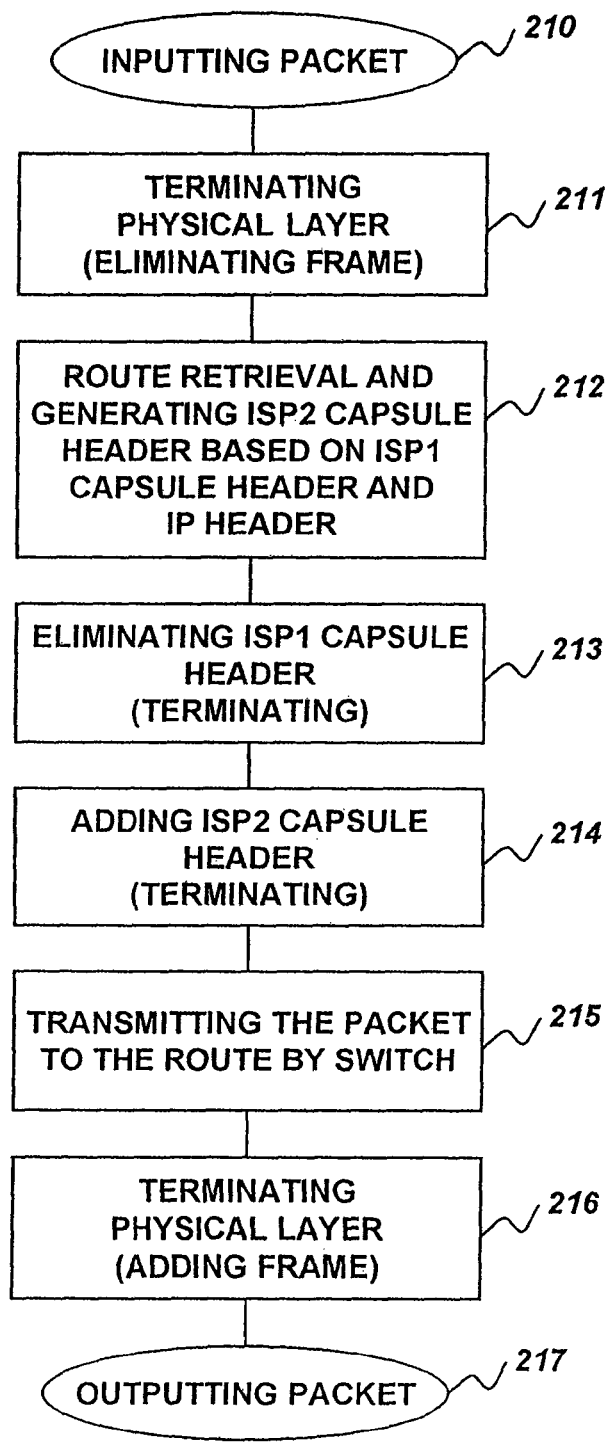
FIG. 5 is a flow chart indicating the operation of the interwork router of the present invention.
Figure 6:
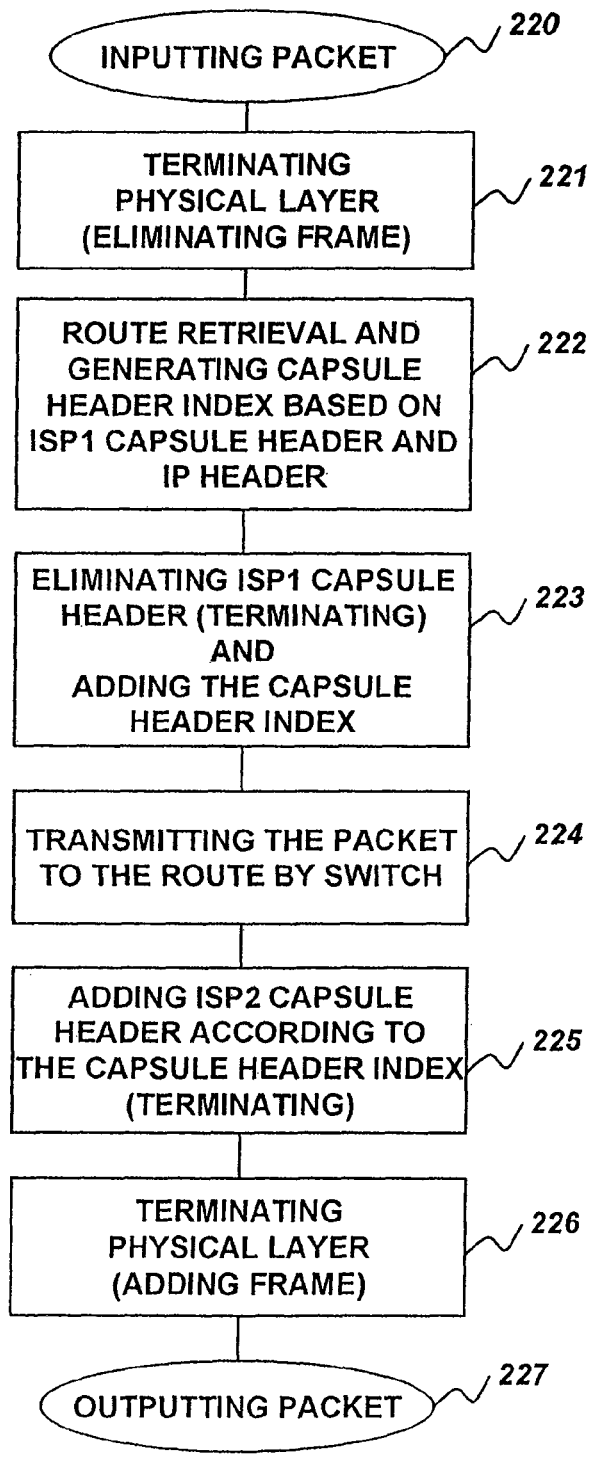
FIG. 6 is a flow chart indicating the operation of the interwork router of the present invention.

Next, the operation of the interwork router (10) will be described with reference to FIGS. 4 to 6. FIG. 4 shows a processing flow of a conventional router. FIGS. 5 and 6 show processing flows of the interwork router (10) of the present invention. The conventional router, when receiving packets, terminates the physical layer (step 201) used for transferring the packets in the ISP1 (2-1) and removes the capsule header used for the transfer operation in the ISP1 from each of those packets (step 202), and then it retrieves the route to the next network according to the value in the IP header of the packet (step 203). Then, the conventional router transfers the packets along the desired route via a switch (step 204). After that, the conventional router adds a capsule header to each of those packets used for the transfer operation in the ISP2 (step 205), and then it executes a processing for the physical layer (step 206) so as to output the packets from the transmission path. In this processing flow, since the capsule header of each packet used in the transfer operation in the ISP1 is removed and the route to the next ISP is determined only with the IP header of the packet, the traffic of a plurality of VPNs are merged once. According to the interwork router of the present invention, however, such the problem can be avoided.

FIG. 5 shows an algorithm executed by the interwork router (10) of the present invention. According to the algorithm, if a packet arrives, the interwork router (10) terminates the physical layer used for the transfer operation in the ISP1 (2-1) (step 211), and then it retrieves the route to the ISP2 according to the capsule header and the IP header of the packet used in the transfer operation in the ISP1, thereby generating a new capsule header for the packet to be used in the ISP2 (step 212). After that, the router replaces the capsule header used in the ISP1 with the new capsule header (step 213), to be used in the transfer operation in the ISP2 (step 214), and then it transfers the packet to the switch. The packet is thus transferred by the switch into the desired route (step 215). After that, the router executes a processing for the physical layer (step 216) to output the packet from the transmission path. Consequently, the packet traffic can be separated from the traffic of other networks. In addition, since naked IP packets from which the capsule header is removed are never supplied to the switch, no other invalid users can insert packets in the VPN from this switch. In other words, it is impossible for invalid IP packets, which are not provided with an internal header used in the ISP2 respectively, are to be mixed with valid IP packets in the ISP2. Consequently, the security of the network is significantly improved.

Next, another embodiment of the present invention will be described with reference to FIG. 6. The interwork router in this embodiment is provided with a table of correspondence between a set of capsule headers and IP header values used for the transfer operation in the ISP1 and capsule header indexes, as well as a table of correspondence between capsule header indexes and the capsule headers used for the transfer operation in the ISP2. The interwork router in this embodiment, if it receives a packet, terminates the physical layer used for the transfer operation in the ISP1 (2-1) (step 221). Then, the interwork router retrieves the route to the ISP2 according to the capsule header and the IP header of the packet, used for the transfer operation in the ISP1, and then it generates a capsule header index for the packet (step 222). After that, the router removes the capsule header used in the ISP1 from the IP packet and adds the generated capsule header index to the IP packet (step 223), and then it transfers the packet to the switch. The switch then transfers the IP packet into the determined route (step 224). Then, the router generates a capsule header to be added to the packet from the capsule header index (step 225). The generated capsule header is used in the transfer operation in the ISP2. The router then executes a processing for the physical layer (step 226) to output the IP packet from the transmission path. This interwork router configuration can also form a closed network with a high security just like that in the configuration shown in FIG. 5. In other words, no invalid IP packet provided with no capsule header index is mixed with valid IP packets in the subject VPN.

Next, a description will be made as to how to compose a VPN over both the ISP1 for supporting the VPN using the MPLS method and the ISP2 for supporting the VPN using IP capsules, as well as an example of a packet configuration, with reference to FIGS. 7 to 10.

Figure 7:
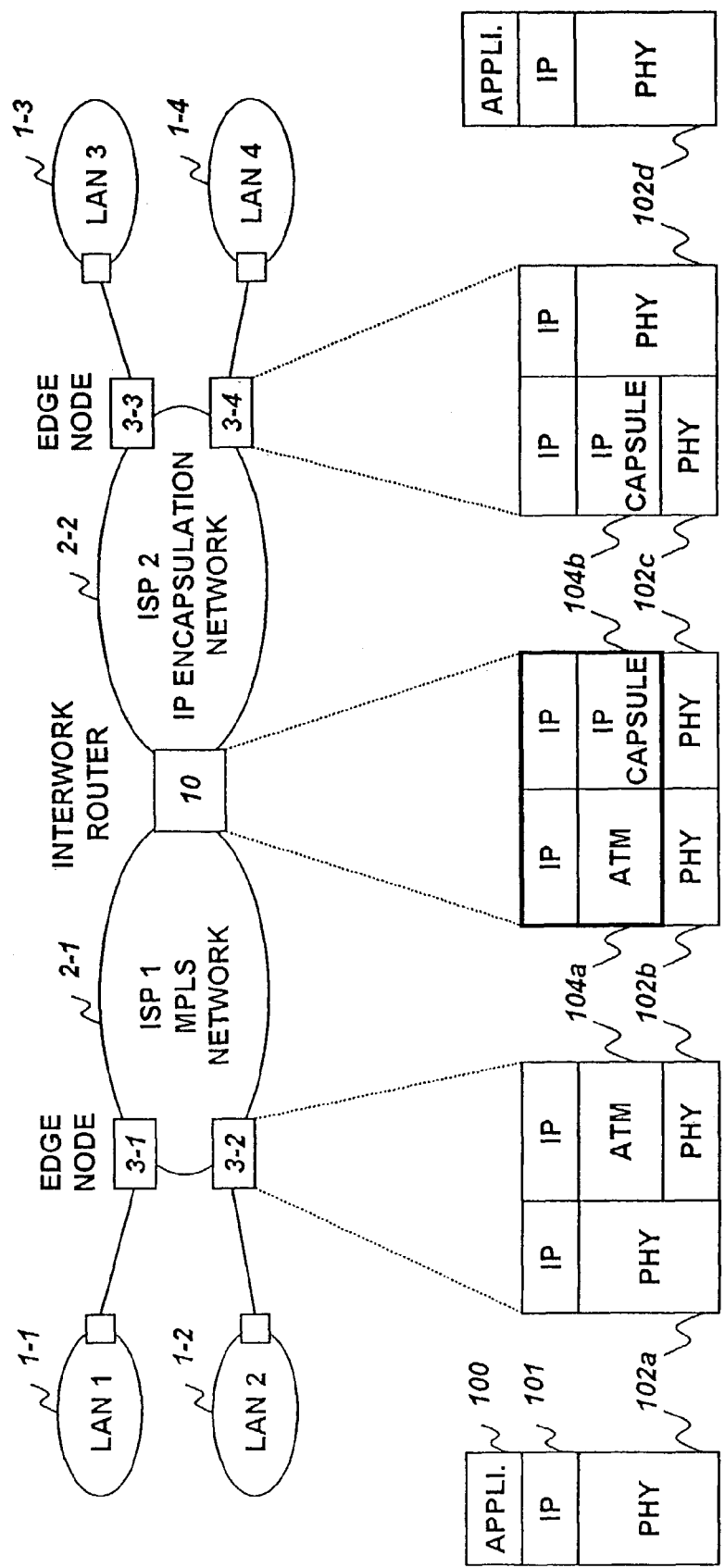
FIG. 7 is a diagram which illustrates a method for connecting an MPLS network with an IP encapsulation network using a protocol stack in an embodiment of the present invention.

FIG. 7 shows an example of a network configuration and protocol stacks. Although no encapsulation method is defined specially in the description with reference to FIG. 3, FIG. 7 shows an embodiment in which the ISP1 employs the MPLS method and the ISP2 employs an IP encapsulation method. The interwork router (10) forwards packets by using a combination of the ATM layer (104a), which is equivalent to a capsule header just like in FIG. 3, with the IP layer (101) and a combination of the IP capsule layer (104b) with the IP layer (101). Consequently, the router (10) can forward packets correctly even when addresses are duplicated due to the private addresses used by each of the VPNs.

Hereunder, a method of encapsulating IP packets in an ATM will be described with reference to FIG. 8. This encapsulation is standardized by RFC1483 of IETF. At first, an LLC/SNAP (Logical Link Control/Subnetwork Attachment Point) (253) is added to each IP packet comprising an IP header (250) and an IP payload (251), then an AAL (ATM Adaptation Layer) 5 header (252) and an AAL5 trailer (255) are added to the IP packet, thereby composing an AAL5 frame. A PAD (254) is then inserted in the AAL5 frame so as to make the AAL5 frame become a constant multiple of 48 octets, which is the length of the ATM cell payload (257). This AAL5 trailer is then divided into ATM cells in units of 48 octets and an ATM header (256) is added to each of the divided ATM cells. The IP packet is thus transferred as one or a plurality of ATM cells.

Figure 9:
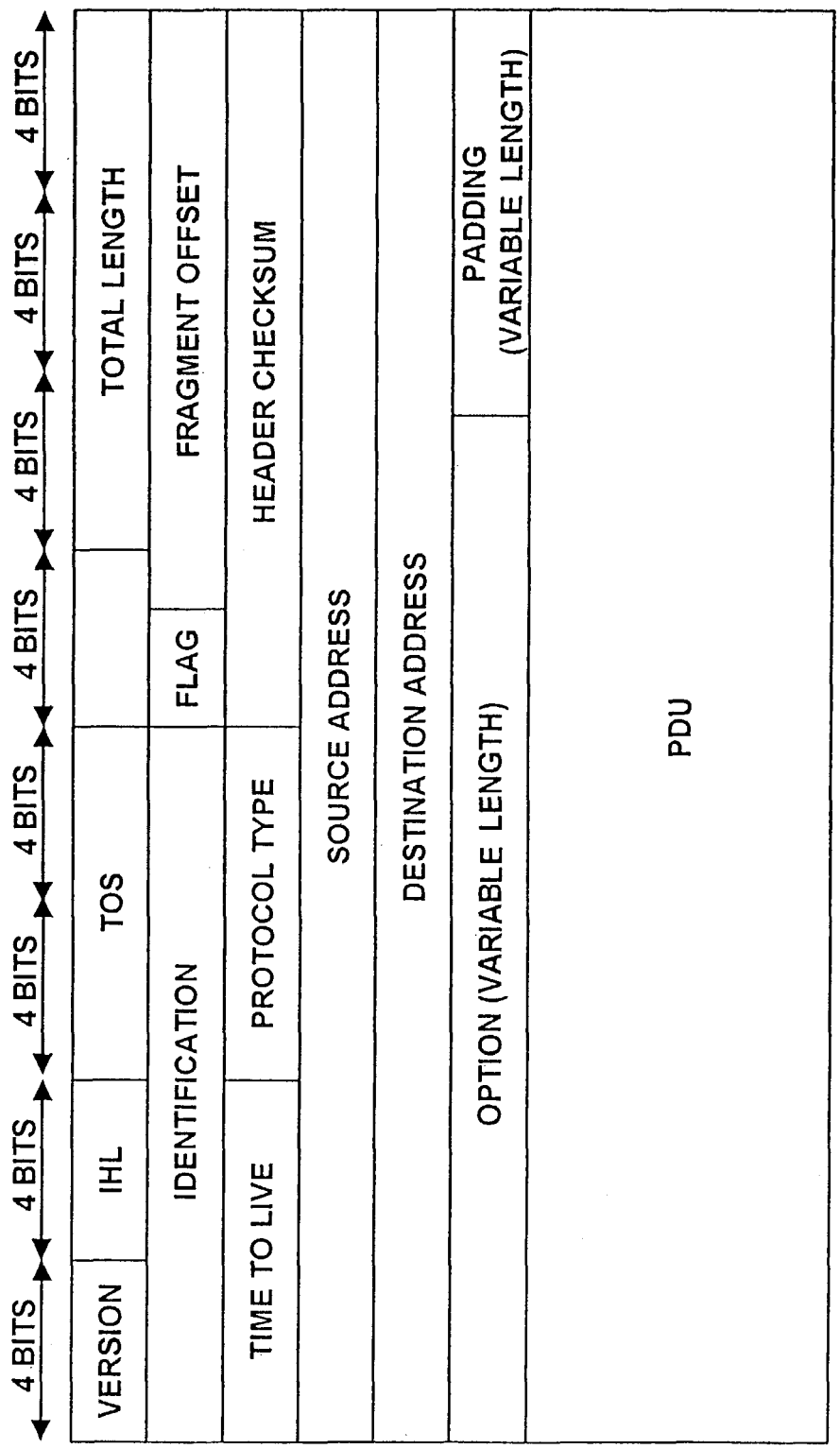
FIG. 9 is a diagram which shows the format of IP packets according to RFC791.

FIG. 9 shows the IPv (Internet Protocol Version) 4 packet format indicated by RFC (Request for Comments) 791. When encapsulating an IP packet, the encapsulation protocol uses the Ipv4 header as is. The conventional Ipv4 router in the subject network can also be used as the router.

Figure 10:
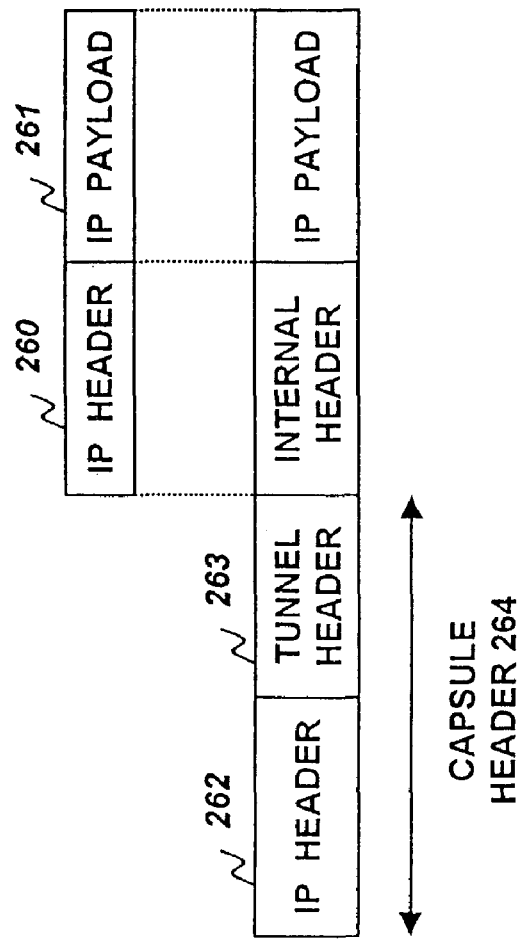
FIG. 10 is a diagram which shows the configuration of an IP tunnel packet according to RFC1853.

FIG. 10 shows a method of encapsulation by the IP tunnel indicated by RFC 1853. This method encapsulates each IP packet comprising an IP header (260) and an IP payload (261) transferred from a user according to the capsule header (264). This capsule header comprises an IP header (262) and a tunnel header (263). This capsule header is used in the ISP2 and it can be identified uniquely in the subject network. Consequently, even when the subject user uses a private address, each IP packet is routed using the capsule header in the network. The IP packet can thus be transferred to the desired edge node. In this embodiment, a tunnel header generated by RFC1583 is taken as an example, but GRE (Generic Routing Encapsulation) encapsulation (RFC1792), IP mobile, and other methods may also be used for encapsulating IP packets.

Figure 8:
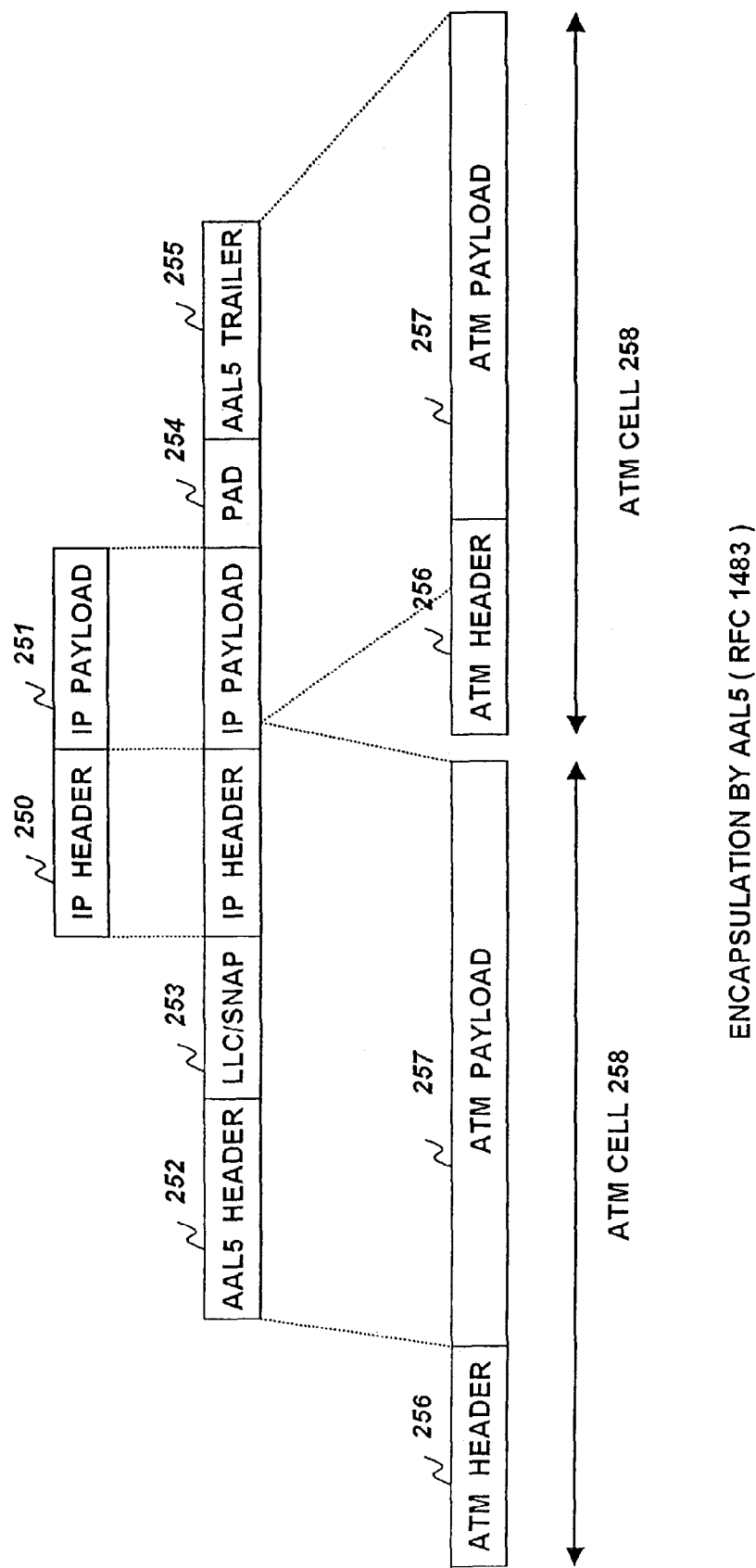
FIG. 8 is a diagram which shows how an IP packet is converted to ATM cells according to RFC1483.

The interwork router (10) combines the capsule header of each packet shown in FIGS. 8 and 10 with the IP address of the user for forwarding the IP packet. Thus, the VPN can be composed with a high security over a plurality of ISPs. The user can also use private addresses so as to compose such a VPN.

Next, an embodiment of the interwork router (10) will be described with reference to FIGS. 11 to 19.

Figure 11:
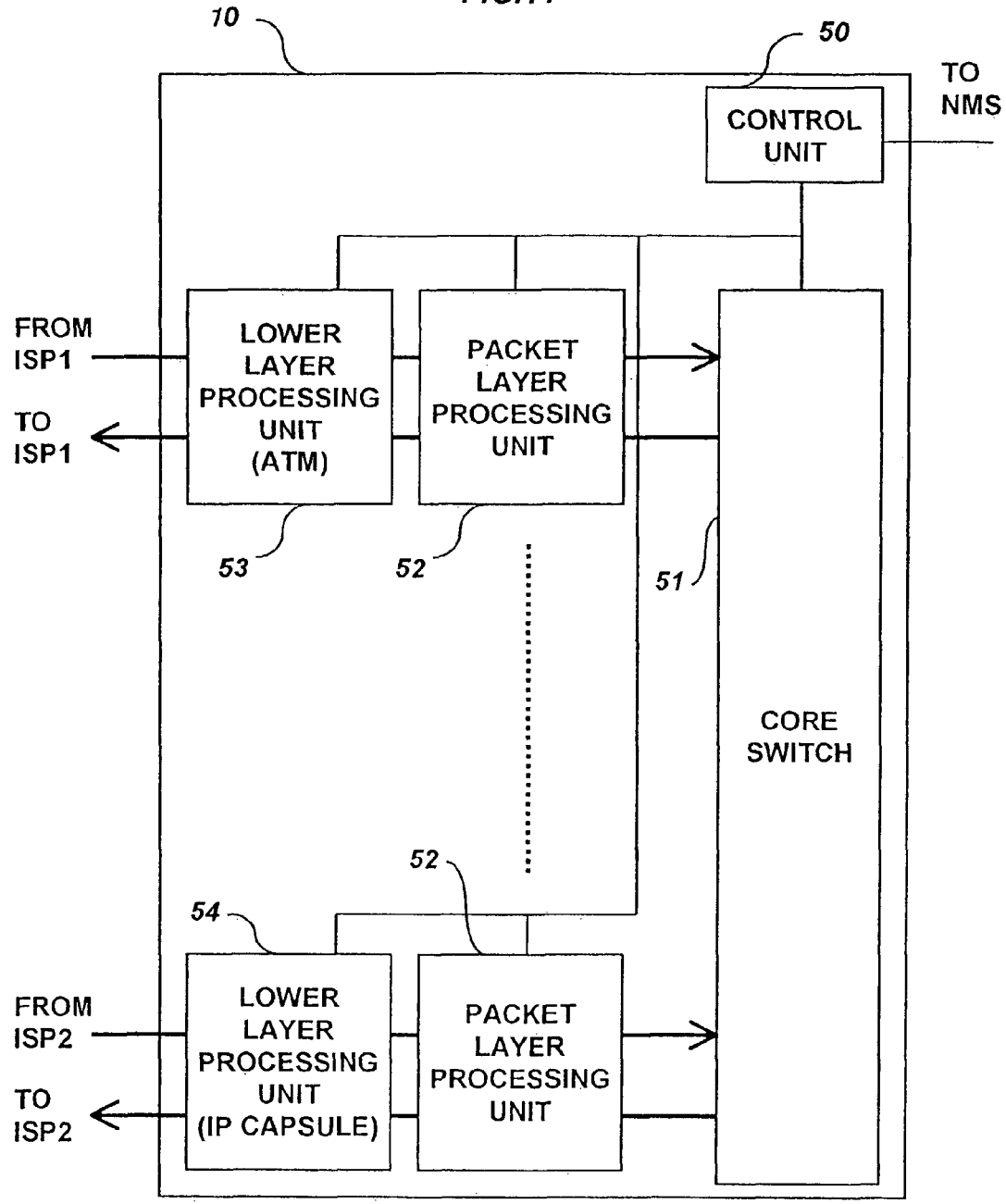
FIG. 11 is a block diagram of the interwork router of the present invention.

FIG. 11 shows a configuration of the interwork router (10). The control unit (50) is used for controlling the whole router (10) and for routing packets to other nodes. The core switch (51) is a switch for transferring packets between packet layer processing units (52). The lower layer processing unit (ATM) (53) is an interface for connecting to the MPLS network of the ISP1, and the lower layer processing unit (IP capsule) (54) is an interface for connecting to the IP capsule network of the ISP2. The packet layer processing unit (52) receives both lower layer information and each IP packet from the lower layer processing units (53 and 54) and determines the destination of the packets according to the combination of the lower layer information and the header information of the IP packet.

Figure 12:
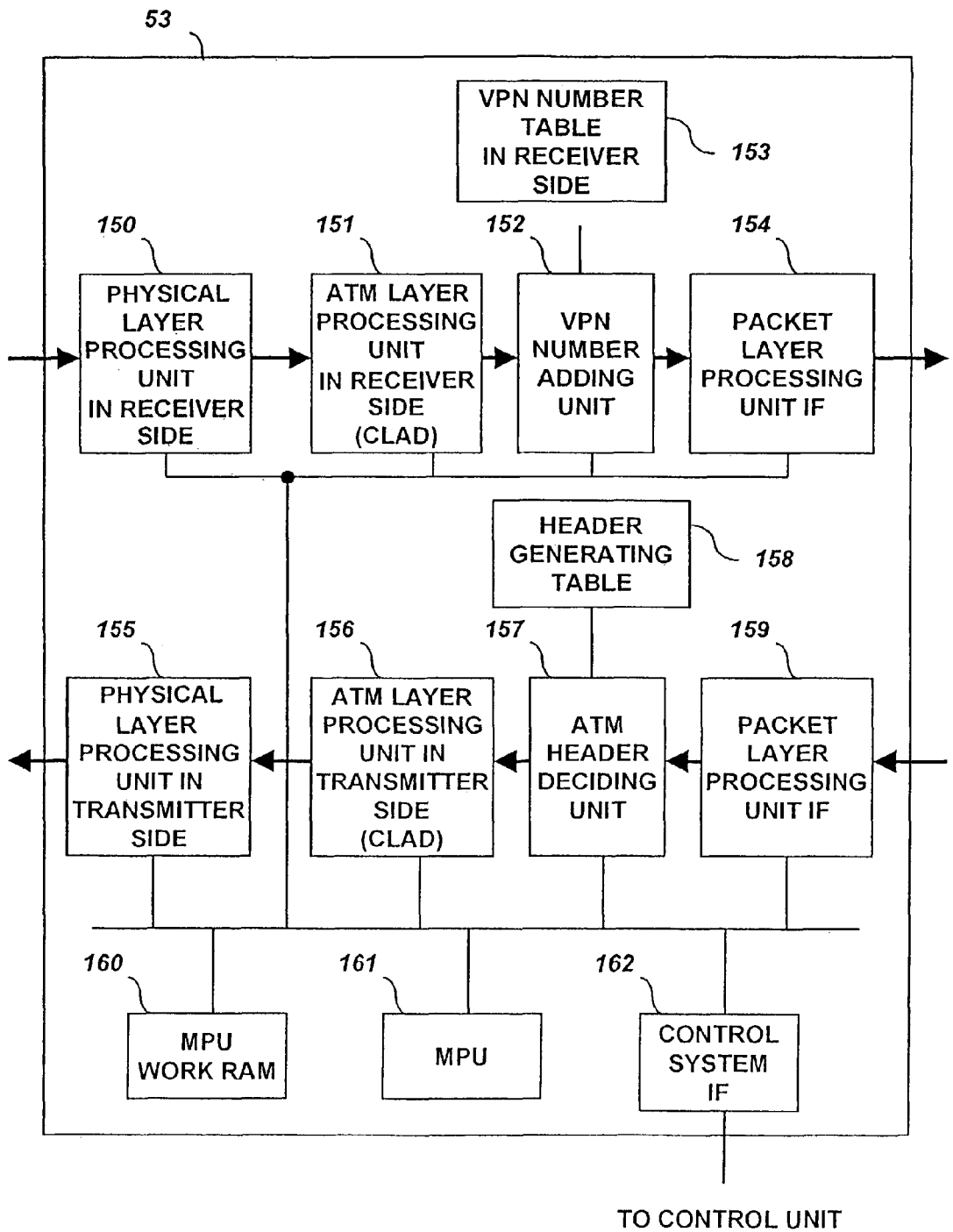
FIG. 12 is a block diagram of a lower layer processing unit provided for the interwork router of the present invention.

At first, the flow of the receiving processing will be described. FIG. 12 shows a block diagram of the lower layer processing unit (ATM) (53). For the signal received from the ISP1 network, the physical layer is terminated at the physical layer processing unit (150), then the ATM layer is terminated at the ATM layer processing unit (151). At this time, the ATM header used to identify the VPN for receiving is also transferred to the VPN number adding unit (152) together with the recomposed IP packet. The VPN number adding unit (152) generates a VPN number which is used to identify the object VPN in the router from the ATM header of the IP packet. At this time, the VPN number table for receiving (153) is used. This VPN number and the IP packet are then transferred together to the packet layer processing unit via the packet processing unit IF (154).

FIG. 13 shows a configuration of the VPN number table for receiving (153). This table (153) comprises pairs of the ATM header in input side (300) and the VPN number in input side (303). The ATM header on the input side is used as an input key for outputting a VPN number on the input side (303). In addition to the VPINCI (Virtual Path Identifiernirtual Channel Identifier) (301), the ATM header on the input side used as an input key may also be the CLP (Cell of Priority) bit (302) indicating the priority of the packet transfer. In addition to the internal VPN number (304), the field of the internal VPN number on the input side may also be provided with another field (305) for the QoS (Quality of Service). A table for mapping CLP and QoS may also be provided independently of this table for identifying each of the VPNs.

Figure 14:
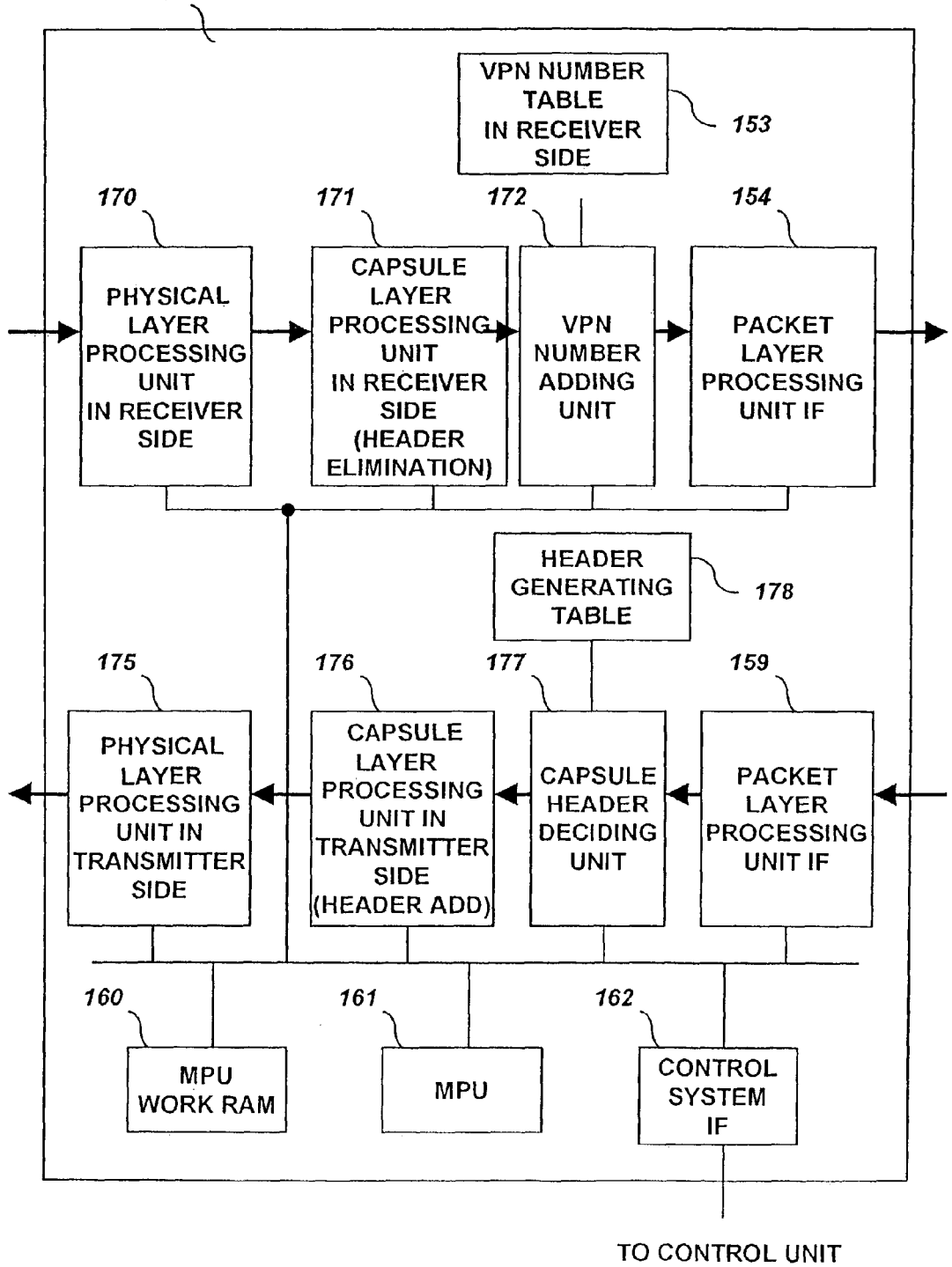
FIG. 14 is a block diagram of the lower layer processing unit provided in the interwork router of the present invention.

FIG. 14 shows a block diagram of the lower layer processing unit (IP capsulation) (54). For the signal received from the ISP2, the physical layer is terminated at the physical layer processing unit (170), and then the capsule header is terminated at the capsule layer receiving processing unit (171). At this time, the terminated capsule header is transferred together with the IP packet to the VPN number adding unit (172). The VPN number adding unit (172) generates a VPN number used to identify respective internal VPNs from the ATM header. At this time, the VPN number table for receiving (173) is used. This VPN number and the IP packet are transferred to the packet layer processing unit via the packet processing unit IF (Interface) (154).

FIG. 15 shows a configuration of the VPN number table for receiving (153). This table comprises pairs of the capsule header on the input side (310) and the VPN number on the input side (303). The ATM header on the input side is used as an input key for outputting the VPN number on the input side (303). In addition to the source address (311) of the capsule header, the IP capsule header on the input side used as an input key may also be the TOS (Type of Service) field (302) for a packet transfer priority. And, in addition to the internal VPN number (304), the internal VPN number on the input side may also be provided with a field (305) indicating the QoS.

In addition, another table for mapping both ToS and QoS may be provided so as to identify VPNs independently of this table.

Figure 16:
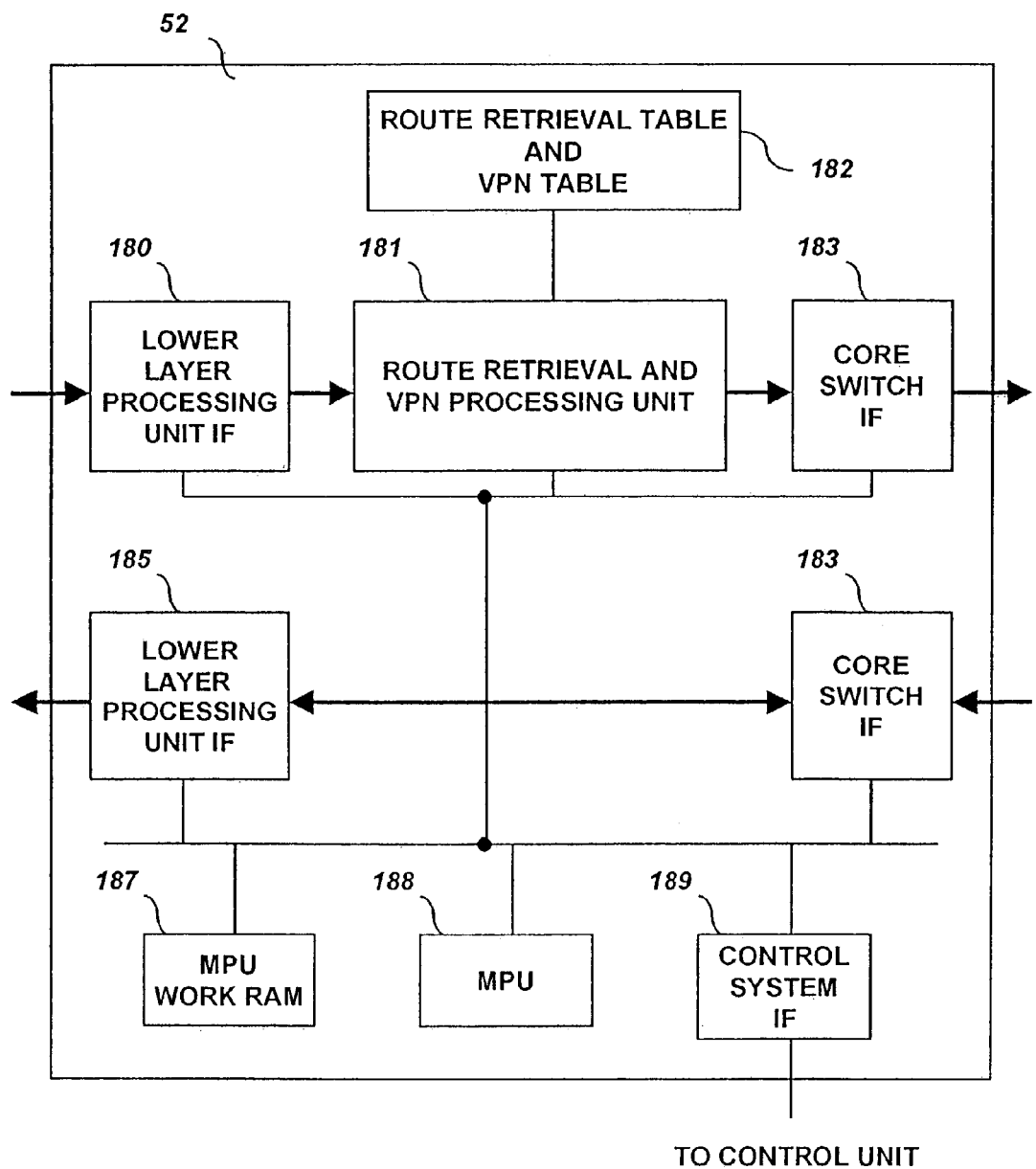
FIG. 16 is a block diagram of a packet layer processing unit provided in the interwork router of the present invention.

Next, a description will be made of a processing executed when an VPN number on the input side (303) and an IP packet arrive at the packet layer processing unit (52) using the method described with reference to FIGS. 12 to 15. FIG. 16 will be referenced for this description. Receiving the VPN number on the input side (304) and the IP packet through the lower layer processing unit (180), the route retrieval table/VPN table (181) retrieves the route to the next network according to the keys (IP header and VPN number on the input side) using the route retrieval table/VPN table (182) and determines a VPN number on the output side. Consequently, the output route, the VPN number on the output side, and the IP packet are transferred to the core switch via the core switch IF, and then they are received by the desired packet layer processing unit.

FIG. 17 shows a configuration of the route retrieval table/VPN table (182). Both the VPN number on the input side (320) and the IP header (323) are used as keys for retrieval processing so as to output both output route number (325) and the capsule number on the output side (326). The output route number (326) is an internal identifier used to transfer packets to a desired interface via both a core switch and other devices. The capsule number on the output side (326) is an internal identifier used to add a capsule header to each packet in the lower layer processing unit. The capsule number on the output side (326) may also be provided with a QoS (328) in addition to the capsule number (327) so as to control transfer priorities.

The operation of the packet layer processing unit (52) illustrated in FIG. 11 will be as follows with respect to a decision as to a transmission direction, as shown in FIG. 16. Receiving both a capsule number on the output side (326) and an IP packet via the core switch IF (184), the packet layer processing unit 52 transfers these information items to the lower layer processing units (53 and 54) illustrated in FIG. 11 through the lower layer processing unit IF.

The operation of the lower layer processing unit (ATM) (53) will be as shown in FIG. 12. The lower layer processing unit (ATM) (53) receives both the capsule number on the output side (326) and IP packet from the packet layer processing unit (52) via the packet layer processing unit IF (159). Then, the ATM header deciding unit (157) generates an ATM header corresponding to the capsule header from the capsule number on the output side (326) with reference to the header generating table (158). The ATM header generated in such a way and the IP packet are converted into ATM cells in the ATM layer transmission processing unit (156), and then the ATM cells are transferred to the ISP1 network via the physical layer transmission processing unit (155).

FIG. 18 shows a configuration of the header generating table. The header generating table outputs an ATM header on the output side according to each capsule number on the output side used as a key. The object ATM header on the output side can thus be obtained from the capsule number on the output side.

In the same way, the operation of the lower layer processing unit (IP capsule) (54) will be as shown in FIG. 14. The lower layer processing unit (IP capsule) (54) receives both a capsule number on the output side (326) and an IP packet from the packet layer processing unit (52) illustrated in FIG. 11 via the packet layer processing unit IF (159). Then, the capsule header deciding unit (177) illustrated in FIG. 14 generates an IP capsule header corresponding to the capsule header and a MAC address on the output side from the capsule number on the output side (326) with reference to the header generating table (178) illustrated in FIG. 14. The IP capsule header and the MAC (Media Access Control) address on the output side generated in such a way, as well as the IP packet, are encapsulated in the capsule layer transmission processing unit (176), and then they are transmitted to the ISP1 network via the physical layer transmission processing unit (175) illustrated in FIG. 14.

Figure 19:
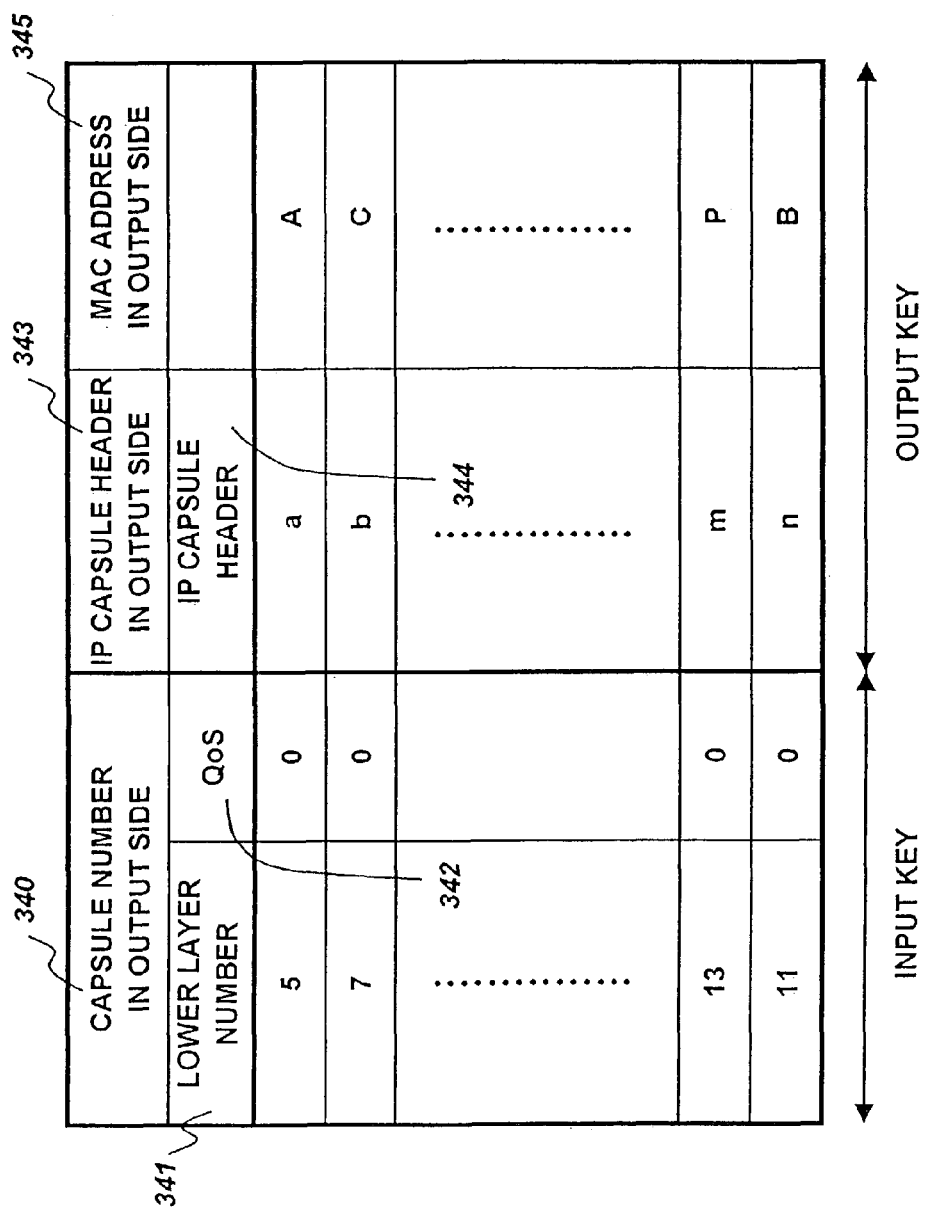
FIG. 19 is a diagram of the header generating table provided in the lower layer processing unit of the present invention.

FIG. 19 shows a configuration of the header generating table (178). The header generating table outputs both an IP capsule header on the output side and a MAC address on the output side according to each capsule number on the output side used as a key.

This completes the description of the configuration of the interwork router. In this embodiment, an VPN number on the input side (320) and a capsule number on the output side (326) that are unified in the router are used for each processing on the input side and output side. However, a capsule header on the input side may be used as an input key of the route retrieval table/VPN table and a capsule header on the output side may be generated directly as an output.

The tables shown in this embodiment are all logical tables. It is thus possible to employ a table retrieval method, which retrieves an address using a retrieval algorithm represented by a tree hierarchy, thereby obtaining a desired output, as well as to employ a CAM (Channel Access Method) configuration and a sequential table retrieval method.

Figure 23:
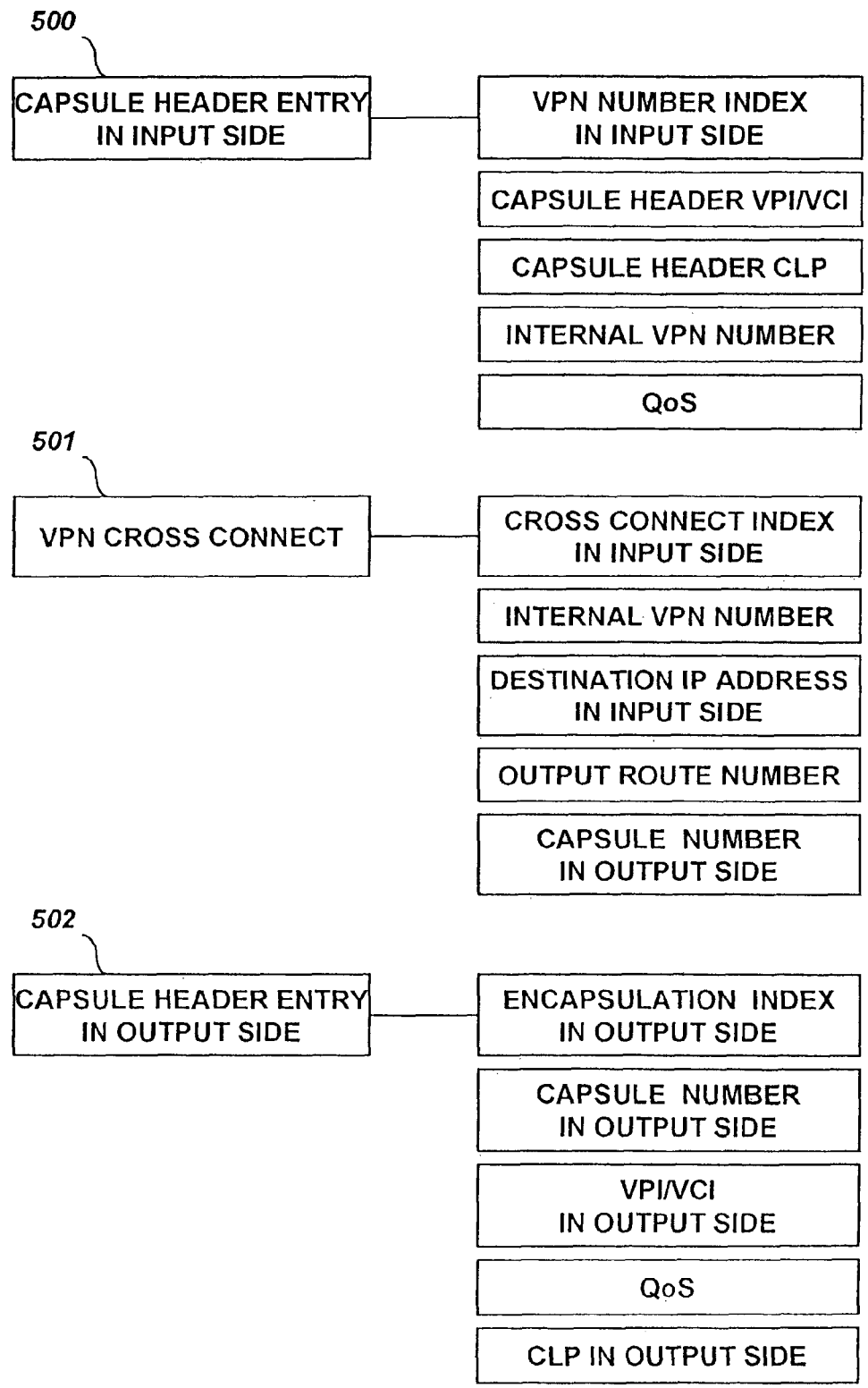
FIG. 23 is a diagram showing an interface for directing the interwork router from an NMS so as to set the tables in an embodiment of the present invention.

FIG. 23 shows a configuration of an MIB (Management Information Base), which is an interface for outputting commands from an NMS to the interwork router, and an agent is mounted in the control unit 50 so as to set the tables in this embodiment. The capsule header entry on the input side (500) is an MIB for setting the VPN table for receiving, as shown in FIG. 13. In the same way, the VPN cross connector entry (501) is an MIB for setting the route retrieval table/VPN table (182) shown in FIG. 17. In the same way, the capsule header entry on the output side (502) indicates a configuration of the header generating table. The information set in those MIBs is set by the NMS for the control unit (50), and then it is set by the control unit (50) in each unit of the interwork router.

So far, a description has been made mainly for a configuration of the interwork router used for a plurality of VPNs. Hereunder, how such an interwork router will be used in a network will be described with reference to FIGS. 20 to 22.

Figure 20:
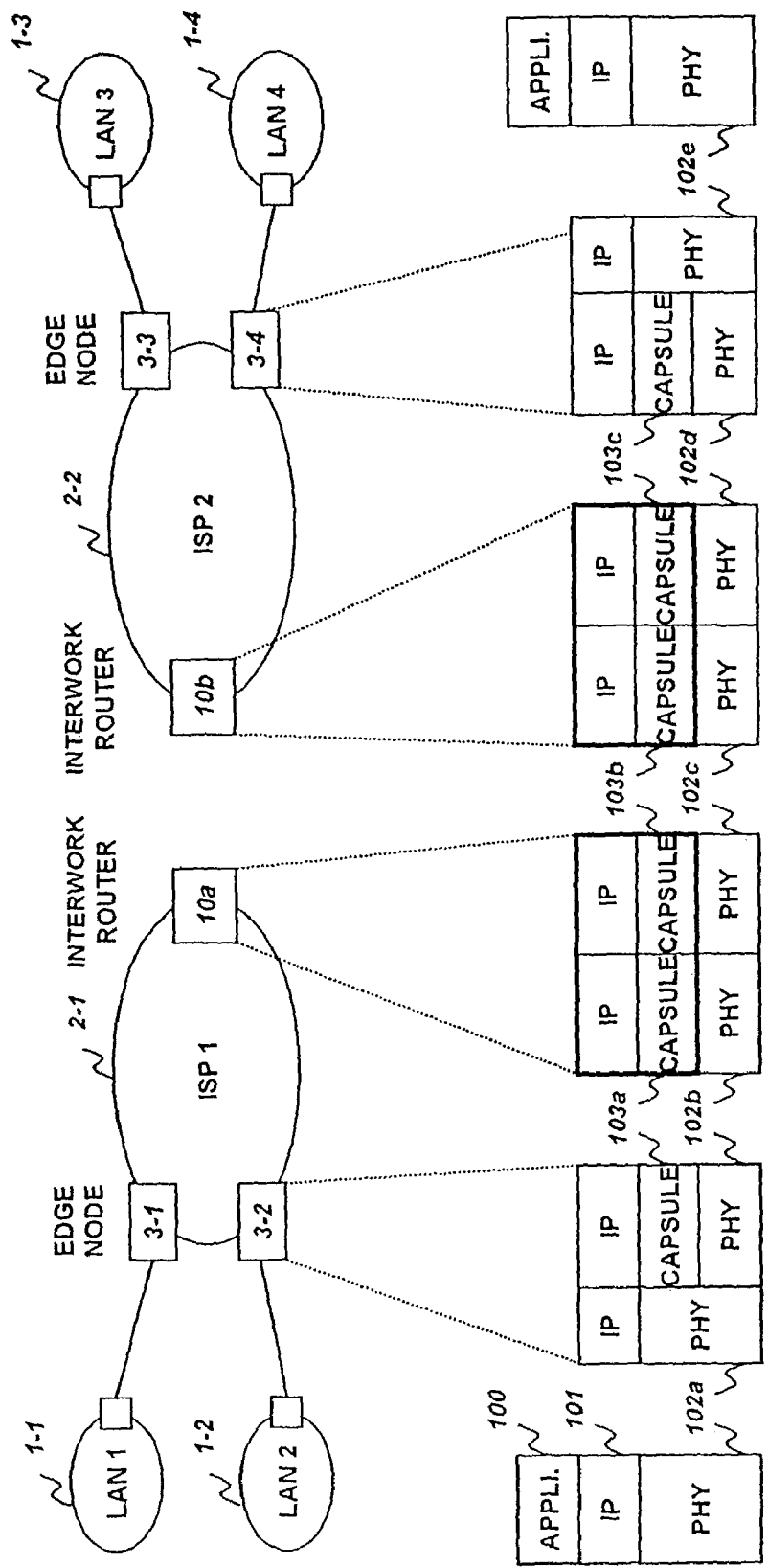
FIG. 20 is a diagram showing an example of the interwork router in a network according to an embodiment of the present invention.

FIG. 20 shows an example of connecting two ISPs to each other via two interwork routers belonging to those two ISPs. Each of those two VPNs is identified according to the header of each packet transferred between those two interwork routers. Each of the interwork routers (10a and 10b) determines the route of packets according to the combination of a capsule header (103a, 103b, or 103c) and an IP address as described with reference to FIGS. 1 through 19.

Figure 21:
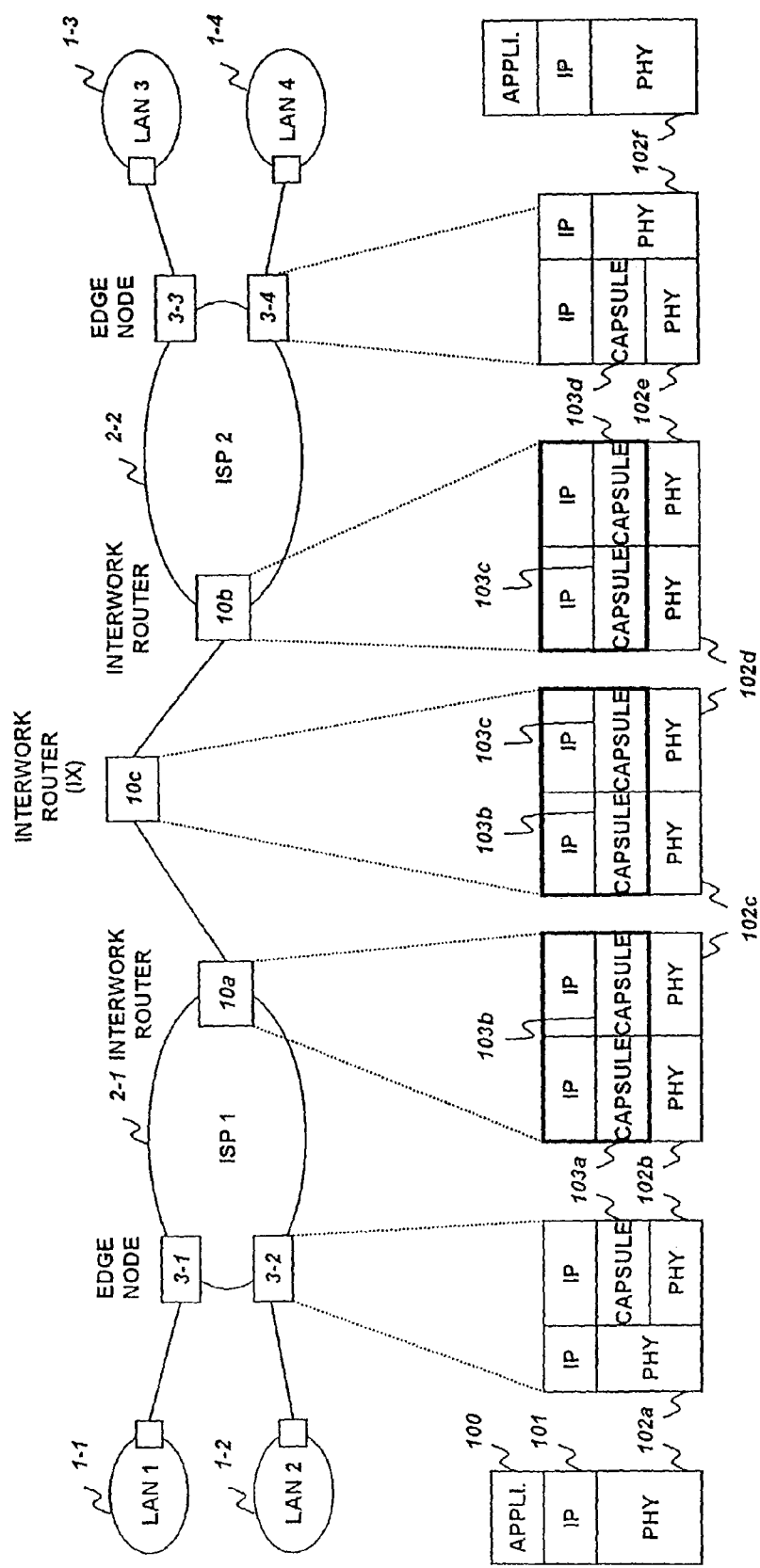
FIG. 21 is a diagram showing an example of the interwork router in a network according to an embodiment of the present invention.

FIG. 21 shows an example of connecting two ISPs to each other via an IX used for layer 3 processing. Each of those two ISPs is provided with an interwork router. Each VPN is identified between each interwork router and the IX according to the capsule header of each packet (103b). Each of the interwork router (10a), the IX (10c), and the interwork router (10b) forwards each packet according to the combination of the capsule header (103a, 103b, or 103c) and the IP address as described with reference to FIGS. 1 through 19.

Figure 22:
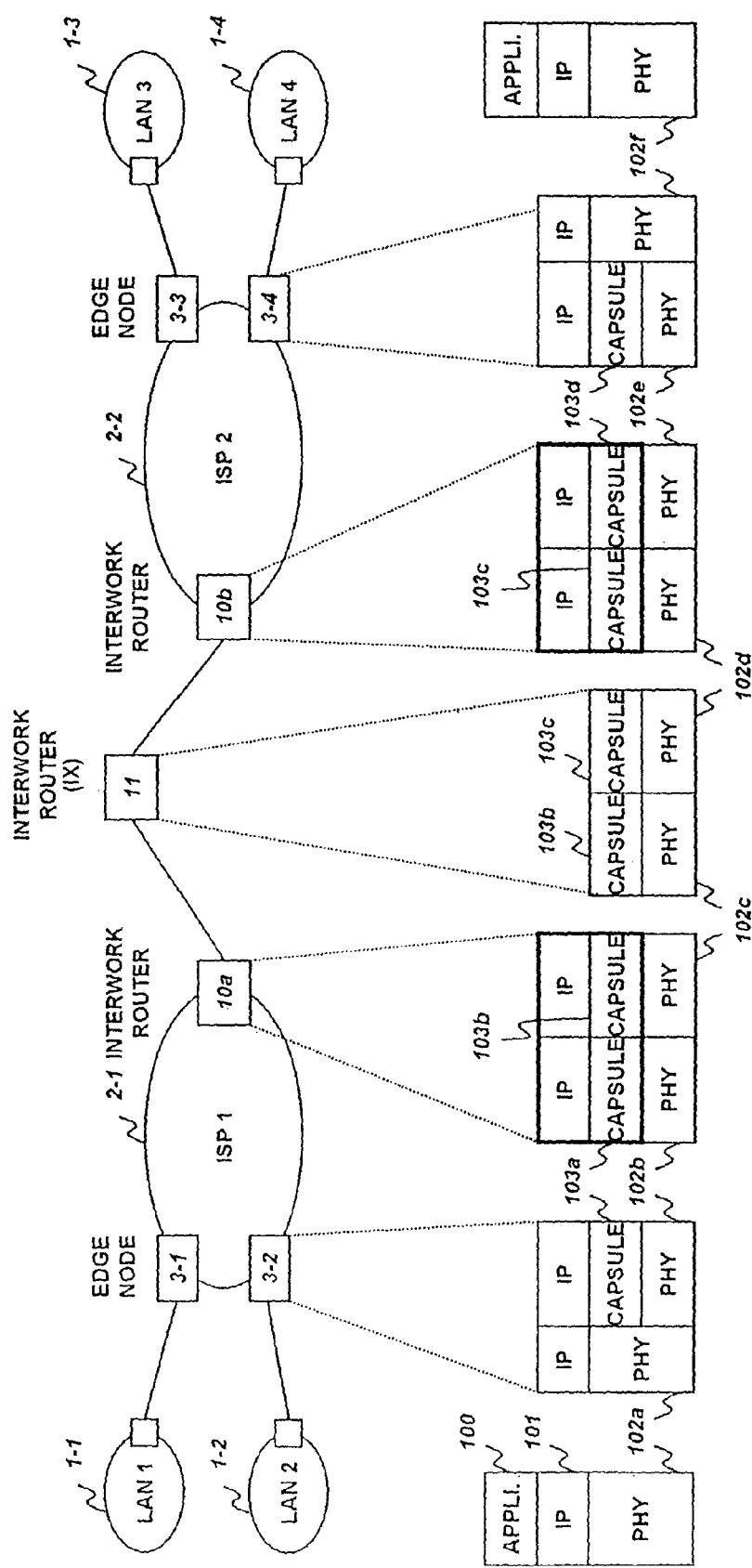
FIG. 22 is a diagram showing an example of the interwork router in a network according to an embodiment of the present invention.

FIG. 22 shows an example of connecting two ISPs to each other via an IX. Each of those two ISPs is connected to an interwork router. The IX in this example is composed of a layer 2 unit, which does not execute layer 3 processing. Also in this case, each VPN is identified between each interwork router and the IX according to the capsule header of each packet (103b). Each of the interwork routers (10a and 10b) forwards each packet according to the combination of the capsule header (103a, 103b, or 103c) and the IP address, as described with reference to FIGS. 1 through 19. The IX transfers packets through layer 2 forwarding processing.

Although a description has been made as to how to connect a VPN over a plurality of ISPs, such a VPN connection is also needed for the same node configuration even when a plurality of encapsulation areas exist in the same ISP. In such a case, the VPN can be connected to those ISPs using the method of the present invention.

According to the present invention, therefore, a VPN network can be composed over a plurality of ISPs as described above. In addition, QoS information can be interworked among a plurality of VPN networks.

Although the present invention has been described in connection with a preferred embodiment thereof, many other variations and modifications will be apparent to those skilled in the art.

What is claimed is:

1. A packet communication apparatus for transmitting a packet from a first network comprising a first Virtual Private Network (VPN) to a second network comprising a plurality of VPNs comprising:
a receiving unit which receives a packet including a destination Internet Protocol (IP) address Layer 3 (L3) or higher, and a first VPN identifier on Layer 2 (L2) used to identify the first VPN in the first network;
a packet generating unit which generates a second VPN identifier on L2 used to identify one of the plurality of VPNs in the second network based on the destination IP address on L3 and the first VPN identifier on L2 included in the received packet; and
a transmitter which transmits a packet having added thereto said second VPN identifier on L2 generated in the packet generating unit.

2. A packet communication apparatus according to claim 1, further comprising:
a processing unit which replaces the first VPN identifier with the second VPN identifier.

3. A packet communication apparatus according to claim 1, further comprising:
a route decision processing unit which decides a route to the second network according to the destination IP address and the first VPN identifier.

4. A packet communication apparatus according to claim 3, wherein the packet is an IP packet.

5. A packet communication apparatus according to claim 1, wherein the packet is an IP packet.

6. A packet communication method of transmitting a packet from a first network comprising a first Virtual Private Network (VPN) to a second network comprising a plurality of VPNs, comprising the steps of:
receiving a packet including a destination Internet Protocol (IP) address on Layer 3 (L3) or higher and a first Virtual Private Network (VPN) identifier on Layer 2 (L2) used to identify the first VPN in the first network;
generating a second VPN identifier on L2 used to identify one of the plurality of VPNs in the second network based on the destination IP address on L3 and the first VPN identifier on L2 included in the received packet; and
transmitting a packet having added thereto the generated second VPN identifier on L2.

7. A packet communication method according to claim 6, further comprising the step of:
replacing the first VPN identifier with the second VPN identifier.

8. A packet communication method according to claim 6, further comprising the step of:
deciding a route to the second network according to the destination IP address and the first VPN identifier.

9. A packet communication system comprising:
a first network comprising a first Virtual Private Network (VPN);
a second network comprising:
a plurality of VPNs; and
a router which:
receives a packet including a destination Internet Protocol (IP) address on Layer 3 (L3) or higher and a first VPN identifier on Layer 2 (L2) used to identify the first VPN in the first network, from the first network,
generates a second VPN identifier on L2 used to identify one of the plurality of VPNs in the second network based on the destination IP address and the first VPN identifier on L2 included in the received packet, and
transmits a packet having added thereto the generated second VPN identifier on L2 from the first network to the second network.

10. A packet communication system according to claim 9, wherein the router replaces the first VPN identifier with the second VPN identifier.

11. A packet communication system according to claim 9, wherein the router decides a route to the second network according to the destination IP address and the first VPN identifier.

12. A packet communication apparatus for transmitting a packet from a first network comprising a first Virtual Private Network (VPN) to a second network comprising a plurality of VPNs, comprising:

a receiving unit which receives the packet including a destination Internet Protocol (IP) address on Layer 3 (L3) or higher and a first VPN identifier on Layer 2 (L2) used to identify the first VPN in the first network, an index generating unit which generates an index based on the destination IP address on L3 and the first VPN identifier on L2 included in the received packet;

a packet generating unit which generates a second VPN identifier on L2 used to identify one of the plurality of VPNs in the second network based on the index; and a transmitter which transmits a packet having added thereto said second VPN identifier on L2 generated in the packet generating unit.

13. A packet communication apparatus according to claim 12, further comprising:

a processing unit which replaces the index with the second VPN identifier.

14. A packet communication apparatus according to claim 12, further comprising:

a route decision processing unit which decides a route to the second network according to the destination IP address and the first VPN identifier.

15. A packet communication apparatus according to claim 12, wherein the packet is an IP packet.

16. A packet communication method of transmitting a packet from a first network comprising a first Virtual Private Network (VPN) to a second network comprising a plurality of VPNs, the packet communication method comprising the steps of:

receiving a packet including a destination Internet Protocol (IP) address on Layer 3 (L3) or higher and a first VPN identifier on Layer 2 (L2) used to identify the first VPN in the first network;

generating an index based on the destination IP address on L3 and the first VPN identifier on L2 included in the received packet; and generating a second VPN identifier on L2 used to identify one of the plurality of VPNs in the second network based on the index;

transmitting a packet having added thereto the generated second VPN identifier on L2.

17. A packet communication method according to claim 16, further comprising the step of:

replacing the index with the second VPN identifier.

18. A packet communication method according to claim 16, further comprising the step of:

deciding a route to the second network according to the destination IP address and the first VPN identifier.

19. A packet communication system comprising:

a first network comprising a first Virtual Private Network (VPN);

a second network comprising:

a plurality of VPNs; and a router which:

transmits a packet including a destination Internet Protocol (IP) address on Layer 3 (L3) or higher and a first VPN identifier on Layer 2 (L2) used to identify the first VPN in the first network, from the first network, generates an index based on the destination IP address on L3 and the first VPN identifier on the L2 included in the received packet, generates a second VPN identifier on L2 used to identify one of the plurality of VPNs in the second network based on the index, and transmits a packet having added thereto the generated second VPN identifier on L2 the second network.

20. A packet communication system according to claim 19, wherein the router replaces the index with the second VPN identifier.

21. A packet communication system according to claim 19, wherein the router decides a route to the second network according to the destination IP address and the first VPN identifier.

* * * * *